(12) United States Patent
Rothstein et al.

(10) Patent No.: US 8,185,953 B2
(45) Date of Patent: May 22, 2012

(54) DETECTING ANOMALOUS NETWORK APPLICATION BEHAVIOR

(75) Inventors: Jesse Abraham Rothstein, Seattle, WA (US); Arindum Mukerji, Seattle, WA (US)

(73) Assignee: ExtraHop Networks, Inc., Seattle, WA (US)

( * ) Notice: Subject to any disclaimer, the term of this patent is extended or adjusted under 35 U.S.C. 154(b) by 1055 days.

(21) Appl. No.: 11/683,643

(22) Filed: Mar. 8, 2007

(65) Prior Publication Data

US 2008/0222717 A1  Sep. 11, 2008

(51) Int. Cl.
H04L 29/06  (2006.01)
(52) U.S. Cl. .................. 726/22; 726/23; 726/24; 726/25
(58) Field of Classification Search .................... 726/14, 726/22, 23, 24, 25
See application file for complete search history.

(56) References Cited

U.S. PATENT DOCUMENTS

| | | | |
|---|---|---|---|
| 6,321,338 B1 * | 11/2001 | Porras et al. ..................... | 726/25 |
| 6,405,250 B1 * | 6/2002 | Lin et al. ....................... | 709/224 |
| 6,526,044 B1 | 2/2003 | Cookmeyer, II et al. | |
| 6,901,517 B1 | 5/2005 | Redmore | |
| 6,944,599 B1 * | 9/2005 | Vogel et al. ..................... | 705/37 |
| 6,999,729 B2 | 2/2006 | Wandel | |
| 7,133,365 B2 * | 11/2006 | Klinker et al. ................. | 370/238 |
| 7,143,153 B1 * | 11/2006 | Black et al. .................... | 709/223 |
| 7,181,769 B1 * | 2/2007 | Keanini et al. .................. | 726/23 |
| 7,580,356 B1 | 8/2009 | Mishra et al. | |
| 7,594,273 B2 * | 9/2009 | Keanini et al. .................. | 726/25 |
| 7,639,613 B1 | 12/2009 | Ghannadian et al. | |
| 7,660,883 B2 * | 2/2010 | Fowlow ......................... | 709/223 |
| 7,774,456 B1 | 8/2010 | Lownsbrough et al. | |
| 2002/0078382 A1 * | 6/2002 | Sheikh et al. .................. | 713/201 |
| 2002/0107953 A1 * | 8/2002 | Ontiveros et al. ............. | 709/224 |
| 2002/0133586 A1 * | 9/2002 | Shanklin et al. .............. | 709/224 |
| 2002/0152209 A1 | 10/2002 | Merugu et al. | |
| 2003/0135667 A1 | 7/2003 | Mann et al. | |
| 2003/0149887 A1 * | 8/2003 | Yadav ........................... | 713/200 |
| 2003/0212900 A1 | 11/2003 | Liu et al. | |
| 2004/0093414 A1 | 5/2004 | Orton | |
| 2004/0146006 A1 | 7/2004 | Jackson | |
| 2004/0162070 A1 * | 8/2004 | Baral et al. .................. | 455/435.1 |
| 2005/0015455 A1 * | 1/2005 | Liu .............................. | 709/207 |
| 2005/0201363 A1 | 9/2005 | Gilchrist et al. | |
| 2005/0234920 A1 * | 10/2005 | Rhodes ........................... | 707/10 |
| 2006/0174343 A1 * | 8/2006 | Duthie et al. .................... | 726/23 |
| 2006/0230456 A1 | 10/2006 | Nagabhushan et al. | |
| 2007/0039051 A1 * | 2/2007 | Duthie et al. .................... | 726/22 |
| 2007/0067841 A1 * | 3/2007 | Yegneswaran et al. ......... | 726/23 |

(Continued)

*Primary Examiner* — Edan Orgad
*Assistant Examiner* — Bradley Holder
(74) *Attorney, Agent, or Firm* — Meyertons Hood Kivlin Kowert & Goetzel, P.C.; Jeffrey C. Hood; Joel L. Stevens (57) ABSTRACT

System and Method for detecting anomalous network application behavior. Network traffic between at least one client and one or more servers may be monitored. The client and the one or more servers may communicate using one or more application protocols. The network traffic may be analyzed at the application-protocol level to determine anomalous network application behavior. Analyzing the network traffic may include determining, for one or more communications involving the client, if the client has previously stored or received an identifier corresponding to the one or more communications. If no such identifier has been observed in a previous communication, then the one or more communications involving the client may be determined to be anomalous. A network monitoring device may perform one or more of the network monitoring, the information extraction, or the information analysis.

23 Claims, 7 Drawing Sheets

U.S. PATENT DOCUMENTS

| | | |
|---|---|---|
| 2007/0077931 A1 | 4/2007 | Glinka |
| 2007/0143852 A1* | 6/2007 | Keanini et al. ................... 726/25 |
| 2007/0153689 A1* | 7/2007 | Strub et al. .................... 370/230 |
| 2007/0156886 A1* | 7/2007 | Srivastava ..................... 709/224 |
| 2007/0157306 A1 | 7/2007 | Elrod et al. |
| 2007/0239639 A1* | 10/2007 | Loughmiller et al. .......... 706/20 |
| 2007/0256122 A1* | 11/2007 | Foo et al. .......................... 726/5 |
| 2008/0022401 A1* | 1/2008 | Cameron et al. ................ 726/22 |
| 2008/0031141 A1 | 2/2008 | Lean et al. |
| 2008/0034424 A1* | 2/2008 | Overcash et al. ............... 726/22 |
| 2008/0034425 A1* | 2/2008 | Overcash et al. ............... 726/22 |
| 2008/0147818 A1* | 6/2008 | Sabo ............................. 709/206 |
| 2009/0034426 A1 | 2/2009 | Luft et al. |

* cited by examiner

Subprocess 408

FIGURE 5A

Subprocess 408

DETECTING ANOMALOUS NETWORK APPLICATION BEHAVIOR

FIELD OF THE INVENTION

The present invention relates to the field of computer networks and more particularly to a system and method for detecting anomalous network application behavior.

DESCRIPTION OF THE RELATED ART

On most of today's computer networks, data is packaged into collections of bytes called packets. The packets are generally transmitted and received by a network interface card (NIC) (e.g., of a computer) in a wired manner, e.g., over a physical medium, such as a cable, or in a wireless manner. Additionally, the packets are transmitted and received according to a network communication protocol suite, such as TCP/IP, among others.

Network monitors have long existed in order to assess the health of and troubleshoot computer networks. These tools have taken the form of software applications as well as specialized network devices. Some network monitors record or analyze packets as they are transmitted over the network. Such tools are commonly called packet sniffers. Packet sniffers that further analyze or dissect the underlying network or application protocols are called protocol analyzers. In general, packet sniffers and protocol analyzers passively monitor network traffic without participating in the communication protocols. In some instances, they receive a copy of each packet on a particular network segment or VLAN. This is generally done though a port mirror or SPAN port on a managed Ethernet switch. In other instances, they are placed in the network between two or more devices and copy packets from one interface to the other.

Unlike protocol analyzers, network proxies do participate in the communication protocols. Network proxies must be placed in the network path between the endpoints. Proxies provide a variety of services, such as caching, content filtering, and access control. HTTP content filters are network proxies that participate in the HTTP protocol in order to limit the content that the client is able to access generally for the purpose of restricting inappropriate content. The content may be filtered in a variety of ways including site blacklists and real-time analysis. Web application firewalls are similar to HTTP content filters; however, rather than limit content by what is appropriate, the web application firewall attempts to protect the web application from malicious or malformed requests. To do so, the web application firewall blocks requests that are malformed, violate configured or learned rules, and/or do not follow a correct path through the site.

Anomalous network application behavior includes network traffic or connections that are out of the ordinary and/or undesired. For example, anomalous behavior may include network communication of which the user is not aware and/or does not desire. Such behavior may include transferring or uploading private data from the client device, downloading new executables or applications to the client device, sending bulk email or spam, or initiating large numbers of network connections as part of a distributed denial of service (DDOS) attack. Anomalous network behavior may be caused by software applications installed on the client device, spyware, malware, and the like. The ability to detect this anomalous network behavior would be desirable.

SUMMARY OF THE INVENTION

Various embodiments of a system and method for detecting anomalous network application behavior are presented herein. When a client requests a resource from a server using an application protocol (such as, for example, HTTP), the resource is specified by an identifier such as a Uniform Resource Identifier (URI), the structure of which is described in RFC 2396. URIs may come from a variety of sources. For example, some URIs may be managed or bookmarked within a software application or entered interactively through an input device. Other URIs may be built into a software application directly. Other URIs may be embedded as a hyperlink in a web page, email, instant message, or the like. Similarly, when a client requests to communicate with an individual or group using email, instant message, IRC, or the other services/software, the identifier may be a contact or contacts which may come from a variety of sources. Some contacts may be stored or managed within an address book component in a software application, stored in a directory service, or entered interactively through an input device, among others. Other contacts may be built into a software application directly, e.g., in a help file of the software application. Other contacts may be embedded in a web page, email, instant message, or the like.

In one embodiment, a network monitor device (NMD) monitors network traffic. The NMD may track network connections from and to the client. The NMD may also extract information from the application protocol information, e.g., may extract identifiers, including or relating to resources that are requested, resources that are referenced in the response, contacts with whom the user communicates, and contacts that are embedded in the resources and/or communications, among possible others. The NMD may store this information for later retrieval and analysis including historical trending. The NMD may use this information to identify traffic that is not anomalous, e.g., including sites, resources, and contacts that appear in the history log one or more times. A threshold and/or score may be used to determine how many appearances in the history log are required to be considered non-anomalous. The score may be determined by a combination of one or more factors including a known rating or reputation, how long ago the resource or contact was accessed, a contextual analysis of the content, the geographic location of the resource or contact, and the like. Additionally, the NMD may assess whether requesting a new resource or communicating with a new contact is expected based on analysis of a previous response or communication. With the non-anomalous traffic identified, the anomalous traffic may be determined, for example, using a process of elimination.

The detection of anomalous transactions in this manner is useful in that it allows identification of unexpected network application behavior, such as a policy violation or security breach, without the need for the violation or breach to have been seen before. Traditional signature-based systems generally require tightly constrained rules in order to set policy; however, the proposed system is inherently more dynamic. This invention may be used in many applications, including but not limited to: employee monitoring, information leakage prevention, parental monitoring, and network security enforcement.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" or "memory" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

Network Connection—a specific exchange of packets over one or more physical or wireless links that enable a computing device to communicate with another computing device over a network. A "communication endpoint" refers to one of the computing devices participating in a network connection. One such network connection may be a TCP connection. TCP connections are virtual connections between two computing devices over a network that initiate, exchange data, and terminate according to the TCP protocol. The TCP protocol is described in more detail in RFC 793, which is available through the IETF. A network connection "over" a particular path or link refers to a network connection that employs the specified path or link to establish and/or maintain a communication.

Client, Server—As used herein the term "client" refers to a computing device's general role as a requester of data or services, and the term "server" refers to a computing device's role as a provider of data or services. In general, it is possible that a computing device can change its role from client to server or vice versa, acting as a client in one transaction and as a server in another transaction or both simultaneously.

Application Session or Session—a series of application interactions between two or more communication endpoints over a network that occur within one or more network connections. Several sessions can use the same network connection, and sessions may span multiple individual connections in parallel or in series.

Application Protocol—a network communication protocol that occupies layer 7 of the ISO Open Systems Interconnection (OSI) seven layer model and/or layer 4 (or 5) of the TCP/IP Internet Reference Model. Common application protocols include HTTP, SMTP, SIP, RTSP, SSH, RTP, and FTP. Within this specification, protocols that can work in conjunction with or on top of HTTP, such as SOAP, are also considered application protocols. The term "Application Protocol" may also be referred to as "Application Layer".

Contact—the digital identity of one or more individuals with whom one communicates using an electronic communication application, service, and/or protocol such as email, instant messaging, Internet Relay Chat (IRC), or the like. Contacts include names, e.g., of services, devices, domains, screen names, handles, etc., user names, and the like.

Address—A sequence of data used to contact or communicate with a service, device, or contact. Examples include IP addresses, URIs, SIP (session initiation protocol) addresses, XRIs (eXtensible resource identifiers), phone numbers, and email addresses, among others.

Identifier—A sequence of data used to identify a service, device, or contact. Examples include addresses as defined above, as well as contacts as defined above.

Embodiments of the present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, embodiments of the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on".

Illustrative Operating Environment

Figure 1:
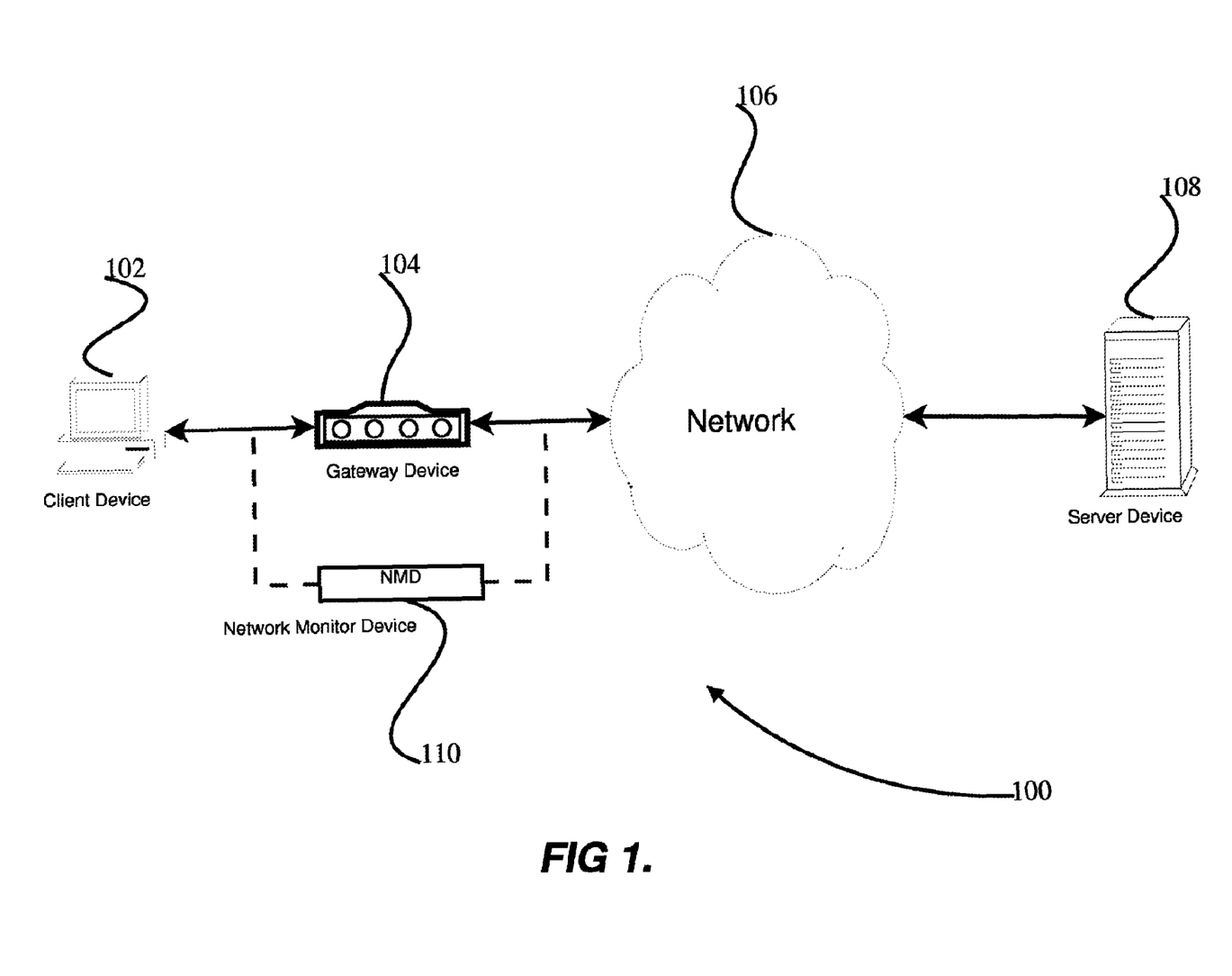
FIG. 1 illustrates a functional block diagram of an exemplary system according to one embodiment of the present invention.

FIG. 1 illustrates a block diagram of an exemplary system according to one embodiment of the present invention. However, it should be noted that not all of the illustrated components may be required to practice the invention. Additionally, the specific arrangement and connections shown are not intended to limit the scope of the invention. In other words, other arrangements, configurations, connections, and/or systems are envisioned. Thus, further variations or modifications to these illustrated or described components are envisioned.

As shown in FIG. 1, system 100 may include client device 102, gateway device 104, network 106, server device 108, and Network Monitoring Device (NMD) 110. As shown, client device 102 may communicate with server 108 through gateway device 104 and over network 106. In some embodiments, NMD 110 may be configured to observe this communication. In various embodiments, the NMD 110 may be physically or virtually connected to the network on either or both sides of gateway device 104. Although not shown, NMD 110 may monitor the communications over other types of networks, e.g., wireless networks. The NMD 110 may operate to perform detection of anomalous network behavior as described herein.

One embodiment of client device 102 is described in more detail below in conjunction with FIG. 2 (where it is depicted as client device 200). The client device 102 may include virtually any computing device capable of communicating with another computing device. Such communication may include requesting or providing data or services including, for example, HTTP transactions, Voice over Internet Protocol (VOIP), Instant Messaging (IM), file transfers, email, and the like. The set of such devices may include devices that typically connect using a wired communications or carrier medium such as personal computers, microprocessor-based or programmable consumer electronics, video gaming consoles, network media players, network PCs, and the like. The set of such devices may also include devices that typically connect using a wireless communications medium such as mobile phones, radio frequency (RF) devices, infrared (IR) devices, integrated devices combining one or more of the preceding devices, or virtually any mobile device. Similarly, the client device 102 may be any device that is capable of communicating over a wired or wireless communication medium such as a Personal Digital Assistant (PDA), Ultra Mobile PC (UMPC), wearable computer, and the like.

The client device 102 may further include various client applications. For example, the client device 102 may include a web browser that transmits HTTP requests over the network 106. In addition, the client device 102 may employ a variety of other client applications to communicate with other devices over network 106, including, but not limited to Voice Over Internet Protocol (VOIP), Instant Messaging (IM), email, Peer-to-Peer file sharing (P2P), or the like. In one embodiment, the client device 102 may employ a plurality of network sessions over one or more possibly secure network connections to another computing device, such as gateway 104, server device 108, or the like. In another embodiment, the client device 102 may employ a tunneling protocol, such as Layer-2 Tunneling Protocol (L2TP), in order to communicate remotely with computing devices such as the gateway 104.

In various embodiments, the client device 102 may communicate with network 106 employing a variety of network interfaces and associated communication protocols. Client device 102 may, for example, have broadband access in the form of a Digital Subscriber Line (DSL), Integrated Services Digital Network (ISDN), cable modem, Digital Signal 1 (DS1) or T1 circuit, Worldwide Interoperability for Microwave Access (WiMAX), or the like. Client device 102 may further employ communication protocols such as Serial Line IP (SLIP) protocol, Point to Point Protocol (PPP), Synchronous Optical Networking (SONET), Asynchronous Transfer Mode (ATM), as well as any of a variety of wireless networking protocols.

The network 106 is configured to allow network connections between client device 102, and other networked devices, such as server device 108. The network 106 may be configured to employ any form of carrier medium for communicating information from one computing device to another. In one embodiment, the network 106 may be the Internet, and may include local area networks (LANs), wide area networks (WANs), direct connections, such as through a universal serial bus (USB) port, Ethernet link, other forms of carrier media, or any combination thereof. On an interconnected set of computer networks, including those based on differing architectures and protocols, a router may be configured to forward packets from one network to another. Communication links within LANs may include unshielded twisted pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), optical fiber links, wireless links including satellite links, or other communications links known to those skilled in the art. Note that the above enumerated communication links, networks, device, and protocols are exemplary only and that other systems, processes, and configurations are envisioned.

The network 106 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for network devices, such as the client device 102, and the like, with various degrees of mobility. For example, the network 106 may enable a wireless network connection over one of the aforementioned access technologies using a protocol for wireless data transfer such as Global System for Mobil communication (GSM), General Packet Radio Services (GPRS), Enhanced Data GSM Environment (EDGE), Wideband Code Division Multiple Access (WCDMA), and the like.

Furthermore, remote computing devices and other related electronic devices could be remotely connected to either LANs or WANs via a modem and/or analog telephone link. In essence, the network 106 includes any communication method or carrier medium by which information may be exchanged between the client device 102 and the server device 108.

The gateway device 106 includes virtually any device that forwards network traffic. Such devices include, for example, routers, proxies, firewalls, access points, link load balancers, devices that perform network address translation, or any combination of the preceding devices. The gateway device 106 may receive data packets from and transmit data packets to the Internet, an intranet, or a LAN accessible through another network, among others. The gateway device 106 may recognize packets that are part of a particular communication protocol and/or are the same network connection or application session. The gateway device 106 may perform special processing on such packets including granting access to the client machine, logging or not logging an event, and network address and port translation.

The NMD 110 may include virtually any device that monitors network traffic. In various embodiments, the NMD 110 may be or include, for example, packet sniffers, protocol analyzers, and the like. In one embodiment, the NMD 110 may receive a copy of each packet transmitted or received by the client device 102. These packets may be copied and delivered by the gateway device 106. Although not pictured, these packets may be copied and delivered by an Ethernet switch, hub, or the like. Alternatively, these packets may be received and then retransmitted by the NMD 110. In one embodiment, the NMD 110 may be integrated directly with the gateway device 104. In another embodiment, the NMD 110 may be placed in the network path between the client device and the server device. In another embodiment, the NMD 110 may be integrated directly with the client device 102 where it may be implemented as software, hardware, or some combination thereof. In another embodiment, the NMD 110 may include a cluster of network devices working together on one or more networks. In another embodiment, NMD 110 may include a collection of client applications working together on one or more client devices. In some embodiments, the NMD 110 may employ a process substantially similar to that described below in conjunction with FIG. 5 to perform at least some of its actions.

In one embodiment, the NMD 110 may be implemented using one or more personal computers, servers, microprocessor-based or programmable consumer electronics, video gaming consoles, network media players, network PCs, radio frequency (RF) devices, infrared (IR) devices, integrated devices combining one or more of the preceding devices, and the like. Such devices may be implemented solely in hardware or in hardware and software. For example, such devices may include some application specific integrated circuits (ASICs) coupled to one or more microprocessors. An embodiment of a network device that could be used as the NMD 110 is the network device 300 of FIG. 3, configured with appropriate software.

Server device 108 may include any computing device capable of establishing and/or maintaining a network connection with the client device 102. In one embodiment, the server device 108 is configured to operate as a web server. However, the server device 108 may also operate as a messaging server, File Transfer Protocol (FTP) server, database server, chat server, media server, online gaming server, and the like. Additionally, the server device 108 may be a single component in a larger online application. Devices that may operate as the server device 108 include personal computers, multiprocessor systems, microprocessor-based or programmable consumer electronics, network PCs, integrated devices combining one or more of the preceding devices, and the like.

Illustrative Client Device

Figure 2:
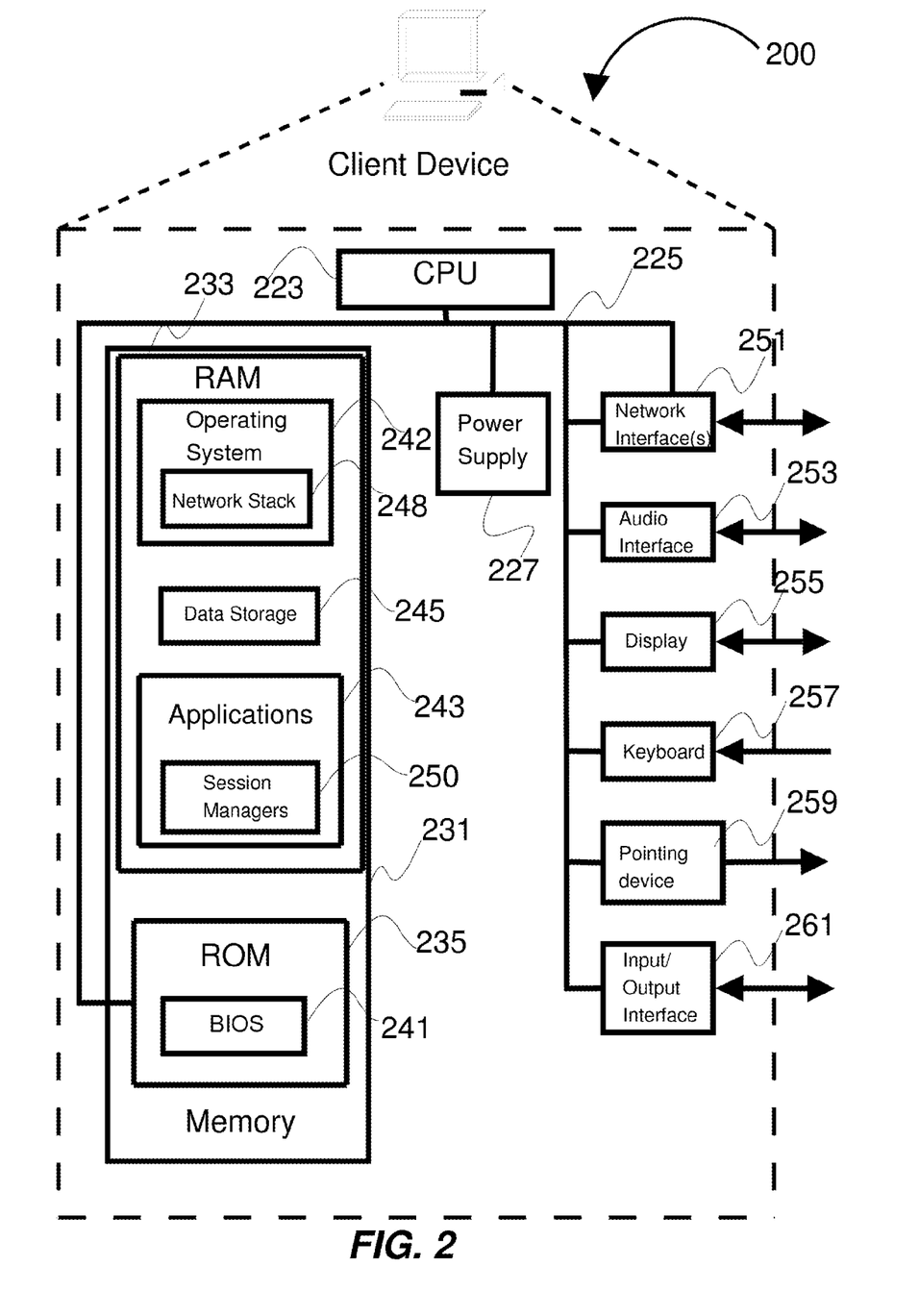
FIG. 2 illustrates an exemplary client device according to one embodiment.

FIG. 2 shows one embodiment of client device 200 that may be included in a system implementing the invention. Client device 200 represents one embodiment of an implementation of client device 102 of FIG. 1.

Generally, the client device 200 may include any personal electronic device. Oftentimes, electronic devices may be capable of personal communication by connecting to one or more wired and/or wireless networks, connecting to multiple nodes of a single wired and/or wireless network, communicating over one or more channels to one or more networks, or otherwise engaging in one or more network connections. The client device 200 may, for example, comprise electronic devices such as Personal Digital Assistants (PDAs), handheld computers, personal computers, microprocessor-based or programmable consumer electronics, video gaming consoles, network media players, network PCs, wearable computers, or the like. The client device 200 may also include a server device, such as the server device 200, among others.

The client device 200 may include many more or less components than those shown in FIG. 2. As shown in the figure, the client device 200 includes a processing unit 223 in communication with memory 231 via bus 225.

The client device 200 may also include a power supply 227, one or more network interfaces 251, an audio interface 253, a display 255, a keyboard 257, a pointing device 259, and/or an input/output interface 261, among others. The power supply 227 may provide power to client device 200. Note that in some embodiments, a rechargeable or non-rechargeable battery may be used to provide power. The power may also be provided by an external power source, such as an AC adapter or a powered docking cradle that supplements and/or recharges a battery.

The client device 200 may optionally communicate with a base station (not shown), or directly with another computing device. The network interface 251 may allow the client device 200 to communicate over one or more networks, and may be constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, and/or the like. Network interface 251 may sometimes be referred to as a transceiver, transceiving device, or network interface card (NIC).

The audio interface 253 is arranged to produce and receive audio signals such as the sound of a human voice. For example, the audio interface 253 may be coupled to a speaker and microphone (not shown) to enable telecommunication with others and/or generate an audio acknowledgment for some action. The display 255 may be a liquid crystal display (LCD), gas plasma, light emitting diode (LED), cathode ray tube (CRT), or any other type of display used with a computing device. The display 255 may also include a touch sensitive screen arranged to receive input from an object such as a stylus or a digit from a human hand.

The keyboard 257 may comprise any input device arranged to receive input from a user. For example, the keyboard 257 may include a push button numeric dial, or a keyboard. The keyboard 257 may also include command buttons that are associated with launching software applications or executing a predefined series of commands. The Pointing device 259 may comprise a trackball, mouse, stylus, or the like.

The client device 200 also comprises input/output interface 261 for communicating with external devices, such as a headset, or other input or output devices not shown in FIG. 2. Input/output interface 261 can utilize one or more communication technologies, such as USB, infrared, Bluetooth™, or the like.

The memory 231 may include a RAM 233, a ROM 235, and other storage means. The memory 230 illustrates another example of computer storage media for storage of information such as computer readable instructions, data structures, program modules or other data. The memory 231 may store a basic input/output system ("BIOS") 241 for controlling low-level operation of the client device 200. The memory 231 may also store an operating system 242 for controlling the operation of the client device 200. It will be appreciated that this component may include a general purpose operating system such as a version of UNIX or Linux, a specialized client communication operating system such as Windows Mobile™ or the Symbian™ operating system, or an embedded or real-time operating system such as VxWorks or Neutrino. The operating system 242 may include, or interface with a Java virtual machine module that enables control of hardware components and/or operating system operations via Java application programs.

The operating system 242 may also include network stack 248. The network stack 248 may represent a suite of components that enable various networking communications. The network stack 248 may be referred to as a TCP/IP stack, a TCP/IP protocol suite, or a networking protocol stack. The network stack 248 may be configured to manage various networking communication protocols within layers 3 and 4 (e.g., the network layer, and the transport layer) of the seven-layer protocol stack as defined by the ISO-OSI (International Standards Organization-Open Systems Interconnection) framework. For example, the network stack 248 may include components configured to manage TCP, UDP, RTP, SCTP, SPX communications, or the like. The network stack 248 may also include components configured to manage IP, ICMP, ARP, BGP, OSPF, RIP, IGRP, X.25 communications, or the like. Moreover, the network stack 248 may be configured to operate in conjunction with various security applications to enable the client device 200 to request and/or establish one or more tunneled network connections with another computing device, including L2TP over DTLS, PPP over SSH, or a variety of other tunneling connection types and/or protocols, including L2TP, PPP, PPTP, IPSec, GRE, MBone, SSL/TLS, and the like.

The memory 231 may further include at least one data storage 245, which can be utilized by the client device 200 to store, among other things, applications 243 and/or other data. For example, the data storage 245 may also be employed to store information that describes various capabilities of the client device 200. The information may then be provided to another device based on any of a variety of events, including being sent as part of a header during a communication, sent upon request, or the like.

The applications 243 may include computer executable instructions which, when executed by the client device 200, transmit, receive, and/or otherwise process messages (e.g., SMS, MMS, IM, email, and/or other messages), audio, video, and enable telecommunication with another user of another client device. Other examples of application programs include calendars, browsers, email clients, contact managers, task managers, transcoders, database programs, word processing programs, security applications, spreadsheet programs, games, and so forth.

Illustrative Network Device

Figure 3:
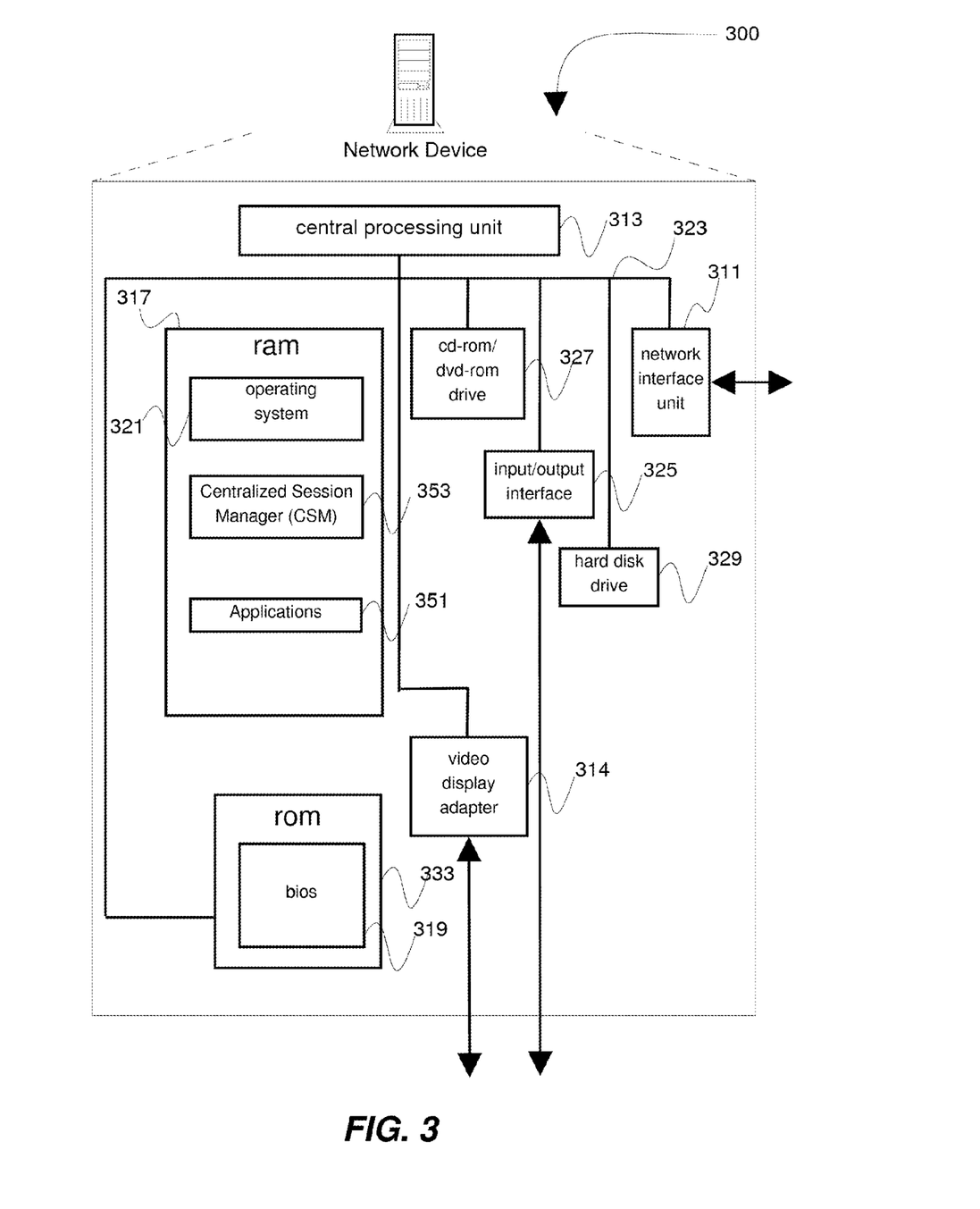
FIG. 3 illustrates a functional block diagram of an exemplary network device according to one embodiment.

FIG. 3 illustrates one embodiment of a network device, according to one embodiment of the invention. Network device 300 may include many more or less components than those shown. The components shown, however, are sufficient to disclose an illustrative embodiment for practicing the invention. The network device 300 may represent, for example, the NMD 110 of FIG. 1.

The network device 300 may include processing unit 313, video display adapter 315, and a memory, which may be in communication with each other via bus 323. The memory generally includes RAM 317, ROM 333, and/or one or more permanent mass storage devices, such as hard disk drive 329, a tape drive, an optical drive, and/or a floppy disk drive, among others. The memory may store the operating system 321 for controlling operation of the network device 300.

As illustrated in FIG. 3, the network device 300 may also communicate with the Internet, or some other communications network, such as the network 106 in FIG. 1, e.g., via the network interface 311, which may be configured for use with various communication protocols including the TCP/IP protocol. The network interface unit 311 is sometimes known as a transceiver, transceiving device, or network interface card (NIC).

The network device 300 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion. Moreover, network device 300 may further include other applications that support virtually any secure connection, including TLS, TTLS, EAP, SSL, IPSec, and the like. Similarly, the network device 300 may include applications that support a variety of tunneling mechanisms, such as VPN, PPP, L2TP, and so forth.

The network device 300 may also include input/output interface 325 for communicating with external devices, such as a mouse, keyboard, scanner, or other input devices not shown in FIG. 3. Likewise, the network device 300 may further include additional mass storage facilities such as CD-ROM/DVD-ROM drive 327 and hard disk drive 329. Hard disk drive 329 may be utilized to store, among other things, application programs, databases, and the like.

In one embodiment, the network device 300 includes at least one Application Specific Integrated Circuit (ASIC) chip (not shown) coupled to the bus 323. The ASIC chip can include logic that performs some of the actions of the network device 300. For example, in one embodiment, the ASIC chip can perform a number of packet processing functions for incoming and/or outgoing packets. In one embodiment, the ASIC chip can perform at least a portion of the logic to enable the operation of session manager 353.

In one embodiment, the network device 300 can further include one or more programmable hardware elements, e.g., field-programmable gate arrays (FPGA) (not shown), instead of, or in addition to, the ASIC chip. A number of functions of the network device 300 can be performed by the ASIC chip, the FPGA, by CPU 313 with instructions stored in memory, or by any combination of the ASIC chip, FPGA, and CPU.

The memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The memory also stores program code and data. One or more applications 351 may be loaded into memory and run on the operating system 321. Examples of application programs may include email programs, routing programs, schedulers, calendars, database programs, word processing programs, web browsers, traffic monitoring programs, security programs, and so forth.

The operating system 321 may further include networking components (not shown) that enable network device to monitor network traffic and/or establish and maintain network connections with at least another computing device. As such, the operating system 321 may include various components to manage operations of the Open Systems Interconnection (OSI) network stack, including Internet Protocol (IP), TCP, UDP, SSL, HTTP, and the like.

Figure 4:
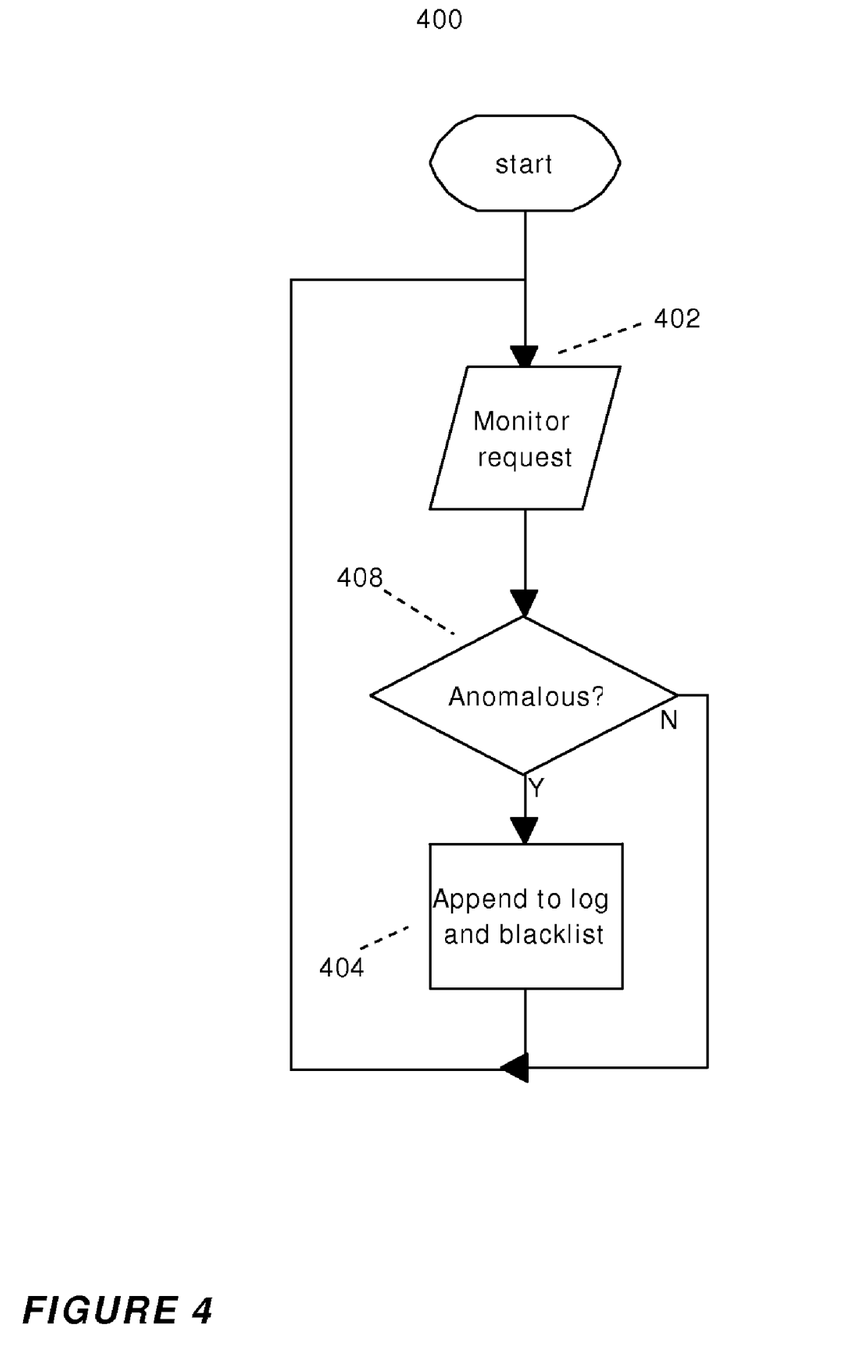
FIG. 4 is a flowchart diagram of an exemplary process for detecting anomalous network application behavior.

FIG. 4—Detection of Anomalous Network Behavior

FIG. 4 is a flowchart diagram illustrating an exemplary process for detecting anomalous network application behavior. The method shown in FIG. 4 may be used in conjunction with any of the computer systems or devices shown in the above Figures, among other devices. In various embodiments, some of the method elements shown may be performed concurrently, in a different order than shown, or may be omitted. Additional method elements may also be performed as desired. Note that various ones of the method elements may be implemented, for example, within or by the NMD 110 of FIG. 1. As shown, this method may operate as follows.

As shown in FIG. 4, process 400 begins, after a start block, at block 402 where traffic is monitored until a request is detected. A request may include a request for data or services from a server, a request to initiate communication with a contact, and the like. In one embodiment, the request may be an HTTP request from a web browser to a webserver. In another embodiment, the request may be an SMTP transaction to send an email message to a recipient. In another embodiment, the request may be an SMTP, POP, or IMAP transaction to receive an email from a sender. In another embodiment, the request may be a request to send a message or transfer a file using an instant messaging service.

Processing then flows to decision block 408, where the request is examined. If the request is identified as anomalous in 408, then processing continues to block 404 where the request may be appended to the request history log and/or the blacklist. In one embodiment, the request history log and/or blacklist is used to determine whether subsequent requests are considered anomalous. Processing then returns to block 402 where traffic is monitored for new requests. Step 408 is described in more detail below with respect to FIGS. 5A and 5B.

Figure 5A:
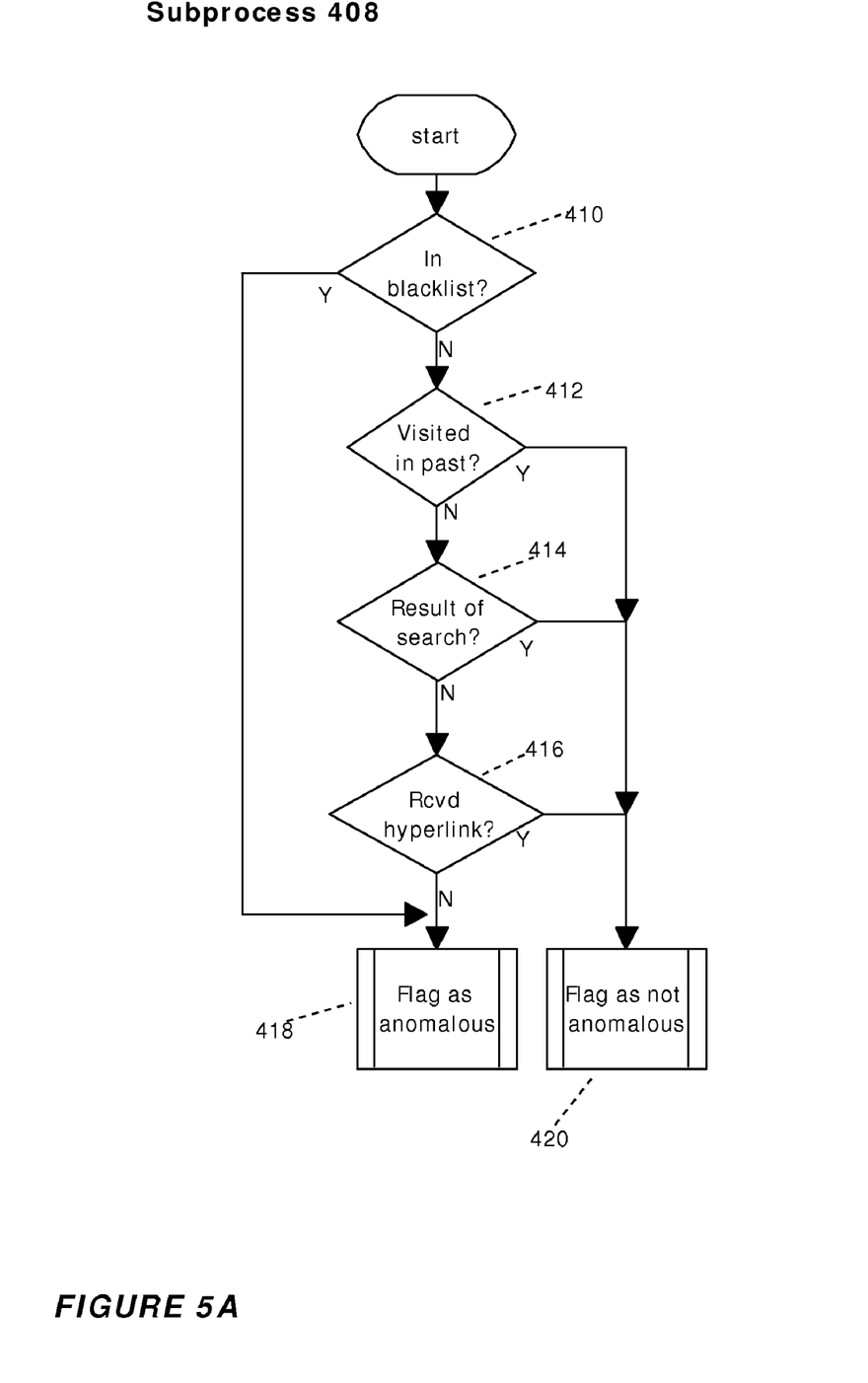
FIG. 5A is a flowchart diagram illustrating one embodiment for detecting anomalous network application behavior within the HTTP protocol.

FIG. 5A—Detecting Anomalous HTTP Requests FIG. 5A illustrates a logical flow diagram generally showing one embodiment of the subprocess performed in 408 for identifying anomalous network application behavior, such as, for example, within the HTTP protocol. The method shown in FIG. 5A may be used in conjunction with any of the computer systems or devices shown in the above Figures, among other devices. In various embodiments, some of the method elements shown may be performed concurrently, in a different order than shown, or may be omitted. Additional method elements may also be performed as desired. Note that various ones of the method elements may be implemented, for example, within or by NMD 110 of FIG. 1. As shown, this method may operate as follows.

Subprocess 408 of FIG. 5A begins at decision block 410. If the request is present in the blacklist as determined in 410 then processing continues to block 418 where the request is flagged as anomalous and processing returns to the calling process. Otherwise, if the request is not present in the blacklist, processing continues to decision block 412.

In block 412, the request history log may be consulted to determine if a resource has been requested from the site in the past, e.g., using a URI. A threshold and/or score may be used to determine how many appearances in the history log are required to be considered non-anomalous. The score may be determined by a combination of one or more factors including a known site rating or reputation, how long ago the site was accessed, a contextual analysis of the content, and/or the geographic location of the site, among others. If the requested site has been visited in the past, for example, then processing continues to block 420 where the request is flagged as non-anomalous and processing returns to the calling process. Otherwise, processing continues to decision block 414.

In decision block 414, the request history log may be consulted to determine if a recent request was to a web search engine. In one embodiment, subsequent requests to new sites after one or more requests to a web search engine are assumed to correspond to the search. In another embodiment, the result set from the web search is analyzed. In one embodiment, the embedded URIs may be extracted and stored, e.g. in a history log. If the request corresponds to a resource referenced in the result of a web search then processing continues to block 420 where the request is flagged as non-anomalous and processing returns to the calling process. Otherwise, processing continues to decision block 416.

At decision block 416, a history log may be consulted to determine if the request is expected due to a previous response or communication. In one embodiment, a subsequent request is expected if it corresponds to an identifier embedded in or related to a previous communication, such as an HTTP response, email, instant message, or the like. In some embodiments, the identifier may relate to another identifier, e.g., a global identifier. In these situations, the identifiers may be mapped using, for example, a lookup or directory service. Thus, determining if the request is expected may include cross-referencing or looking up identifiers corresponding to the identifier embedded in the previous communication(s). If the requested resource corresponds to a recently received identifier such as a hyperlink, then processing continues to block 420 where the request is flagged as non-anomalous and processing returns to the calling process. Otherwise, processing continues to block 418 where the request is flagged as anomalous and processing returns to the calling process.

Figure 5B:
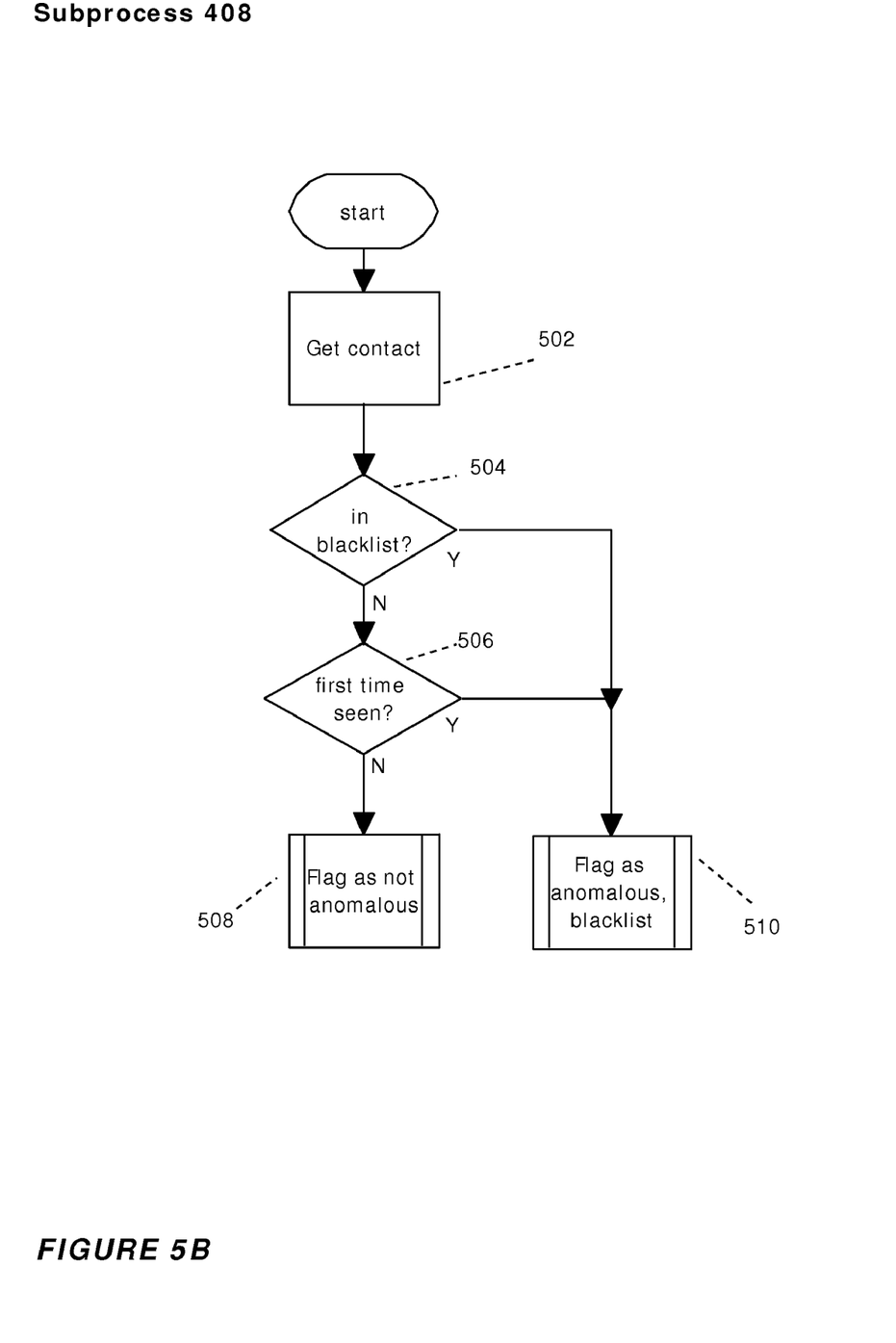
FIG. 5B is a flowchart diagram illustrating one embodiment for detecting anomalous contacts.

FIG. 5B—Detecting Anomalous Contacts

FIG. 5B illustrates a logical flow diagram generally showing one embodiment of the subprocess performed in 408 for identifying anomalous network application behavior, such as, for example, detecting anomalous contacts. The method shown in FIG. 5B may be used in conjunction with any of the computer systems or devices shown in the above Figures, among other devices. In various embodiments, some of the method elements shown may be performed concurrently, in a different order than shown, or may be omitted. Additional method elements may also be performed as desired. Note that various ones of the method elements may be implemented, for example, within or by NMD 110 of FIG. 1. As shown, this method may operate as follows.

Subprocess 408 of FIG. 5B, begins at block 502 where the request is examined for communication from or to a contact using an electronic communication application, service, and/or protocol such as email, instant messaging, IRC, or the like. Processing then flows to decision block 504.

In decision block 504, a black list may be consulted. In one embodiment, the black list contains a list of identifiers, e.g., contacts or services, with which communication is restricted. Such communications may be a violation of policy, may require additional administrative review, or may require logging for regulatory compliance. In another embodiment, a policy or reputation service is consulted which provides a remote or virtual blacklist. In another embodiment, the black list represents requests that are awaiting and/or have explicitly not received administrative approval. If the contact is present in the black list, then processing continues to block 510 where the request is flagged as anomalous and processing returns to the calling process. Otherwise, processing flows to decision block 506.

At decision block 506, the history log may be consulted to determine if communication with the contact has occurred in the past. A threshold and/or score may be used to determine how many appearances in the history log are required to be considered non-anomalous. The score may be determined by a combination of one or more factors including a rating or reputation of the communication service, how long ago the communication occurred, the number of messages exchanged, whether the exchange involved one party or both parties, a contextual analysis of the content, the geographic location of the remote contact, and the like. If communication with the contact has occurred in the past then processing continues to block 508 where the request is flagged as non-anomalous and processing returns to the calling process. Otherwise, processing continues to block 510 where the request is flagged as anomalous and processing returns to the calling process.

Figure 6:
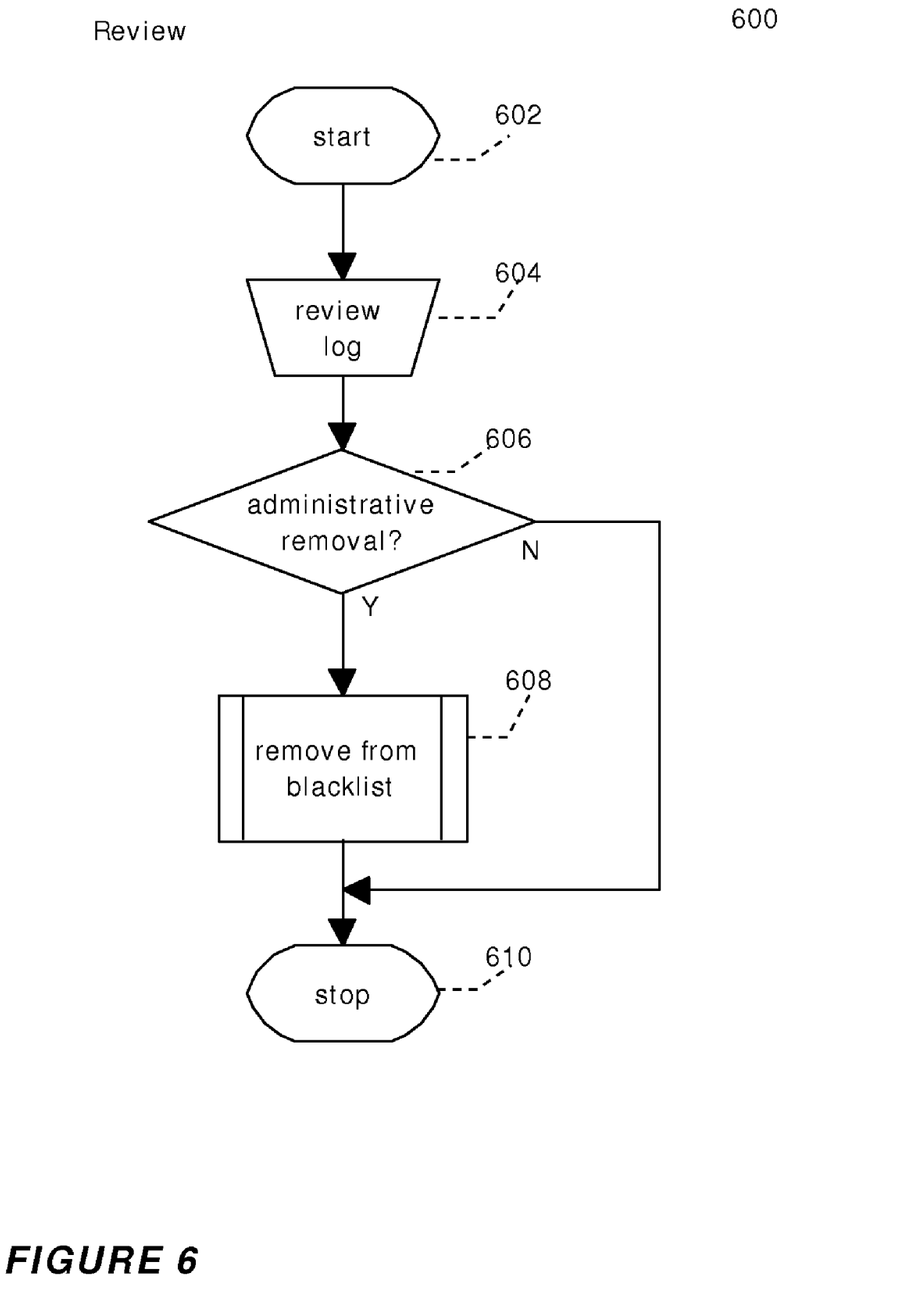
FIG. 6 is a flowchart diagram illustrating one embodiment for administrative review of anomalous network application behavior.

FIG. 6—Administrative Review

FIG. 6 illustrates a logical flow diagram generally showing one embodiment for administrative review of anomalous network application behavior. The method shown in FIG. 6 may be used in conjunction with any of the computer systems or devices shown in the above Figures, among other devices. In various embodiments, some of the method elements shown may be performed concurrently, in a different order than shown, or may be omitted. Additional method elements may also be performed as desired. Note that various ones of the method elements may be implemented, for example, within or by NMD 110 of FIG. 1. As shown, this method may operate as follows.

As shown in FIG. 6, process 600 begins, after a start block, at block 604 where an administrator reviews the log of anomalous network application behavior. In one embodiment, the log includes every request or communication that is flagged as anomalous. In another embodiment, the log aggregates two or more requests or communications that are related into a single transaction. FIG. 4 and FIG. 5 describe possible processes for flagging anomalous network application behavior. Processing then flows to decision block 606.

At decision block 606, the administrator may be queried to approve or deny each flagged transaction. In some embodiments, querying the administrator may include displaying the anomalous network application behavior to the administrator in a GUI. If the administrator approves the transaction, then processing continues to block 608 where the transaction is removed from the blacklist. Note that input specifying each flagged transaction may not necessarily be limited to administrator or other user input. In some embodiments, the input may be received from various systems (e.g., the NMD, the client, the server, or other systems such as external devices or software). Processing then flows to stop block 610.

In one embodiment, network application behavior that is determined to be anomalous is appended to a log for subsequent review. In another embodiment, one or more alerts are generated in response to anomalous behavior. For example, alerts may take the form of emails, SMS messages, SNMP traps, blinking lights, indicators on a GUI, or the like. In another embodiment, network connections corresponding to anomalous network application behavior are prevented. Examples of such prevention include, declining to forward packets associated with such connections, configuring firewalls or other network devices to block such connections, resetting such connections, or quarantining the originator of the aforementioned anomalous behavior. In another embodiment, network connections corresponding to anomalous network application behavior are limited. Examples of such limiting include, rate limits, rate shaping, transaction limits, connection limits, quality of service limits, and the like. Limits may be enforced directly or by an upstream network device according to a configured policy or labeling of the network connection.

It will be understood that each block of a flowchart illustration (such as in FIGS. 4-6 described above) need not be limited in the ordering shown in the illustration, and may be performed in any ordering, or even performed concurrently, without departing from the spirit of the invention.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer-accessible storage medium comprising program instructions for detecting anomalous network application behavior, wherein the program instructions are executable to:

monitor a first plurality of communications between at least one client and a first one or more servers, wherein the at least one client and the first one or more servers communicate using one or more application protocols, wherein said monitoring the first plurality of communications is performed without participating in the communication between the at least one client and the first one or more servers;

determine a plurality of identifiers based on said monitoring the first plurality of communications, wherein at least a subset of the plurality of identifiers are comprised in content of the first plurality of communications, wherein said determining is performed without participating in the communication between the at least one client and the one or more servers, and wherein the plurality of identifiers comprise one or more of a contact, an IP address, a uniform resource identifier (URI), an extensible resource identifier (XRI), an email address, a service name, a device name, a telephone number, an SIP address, a domain name, an online screen name, an online handle, or a user name;

monitor a second plurality of communications between the at least one client and a second one or more servers, wherein the at least one client and the second one or more servers communicate using one or more application protocols, wherein said monitoring the second plurality of communications is performed without participating in the communication between the at least one client and the second one or more servers;

for one or more communications of the second plurality of communications, determine if the one or more communications are anomalous based at least in part on the at least a subset of the determined plurality of identifiers, wherein said determining is performed at the application-protocol level, wherein if the one or more communications do not correspond to one of the plurality of identifiers, the one or more communications of the at least one client are determined to be anomalous, wherein said determining comprises:

analyzing the second plurality of communications to determine non-anomalous network application behavior between the at least one client and the one or more servers using the at least a subset of the determined plurality of identifiers; and determining the anomalous network application behavior by eliminating the determined non-anomalous network application behavior from the second plurality of communications; and store information regarding the determined anomalous network application behavior.

2. The non-transitory computer-accessible storage medium of claim 1, wherein said determining if the one or more communications are anomalous comprises:
for the one or more communications of the second plurality of communications, determining if the one or more communications are anomalous based on a list of known anomalous identifiers, wherein if the one or more communications correspond to a known anomalous identifier, the one or more communications between the at least one client and the server are determined to be anomalous.

3. The non-transitory computer-accessible storage medium of claim 1, wherein said determining the plurality of identifiers comprises determining an identifier from one or more emails received by the at least one client.

4. The non-transitory computer-accessible storage medium of claim 1, wherein said analyzing the second plurality of communications uses a Universal Resource Identifier (URI) comprised in the first plurality of communications.

5. The non-transitory computer-accessible storage medium of claim 1, wherein said analyzing the second plurality of communications uses an identifier comprised in one or more recent searches comprised in the first plurality of communications.

6. The non-transitory computer-accessible storage medium of claim 1, wherein said analyzing the second plurality of communications uses an identifier comprised in one or more online chat or instant messages received by the at least one client comprised in the first plurality of communications.

7. The non-transitory computer-accessible storage medium of claim 1, wherein said analyzing the second plurality of communications uses an identifier associated with contacts with whom the at least one client has already communicated in the first plurality of communications.

8. The non-transitory computer-accessible storage medium of claim 1, wherein said determining the plurality of identifiers comprises one or more of:
determining requested resources;
determining resources that are referenced in response to requests;
determining resources that are referenced in communications;
determining contacts with whom a user of the client communicates; or
determining contacts that are embedded in resources and/or communications.

9. The non-transitory computer-accessible storage medium of claim 1, wherein said determining the plurality of identifiers comprises one or more of:
using a threshold value;
comparing contacts to known ratings or reputation;
determining geographic location of the contact;
comparing an access time of the contact with the current time;
comparing a communication with nearby communications to determine context of the communication; or
determining at least one client communication patterns, wherein said determining anomalous network application behavior is based on the determined at least one client communication patterns.

10. The non-transitory computer-accessible storage medium of claim 1, wherein said monitoring the first plurality of communications, said determining the plurality of identifiers, said monitoring the second plurality of communications, and said determining if the one or more communications are anomalous is performed by a network monitor device (NMD).

11. The non-transitory computer-accessible storage medium of claim 1, wherein the program instructions are further executable to:
display the information regarding the determined anomalous network application behavior;
receive user input regarding one or more of the anomalous communications specifying the one or more communications as anomalous or non-anomalous.

12. The non-transitory computer-accessible storage medium of claim 1, wherein the program instructions are further executable to:
receive input specifying that a communication between a client and a server which was determined to be anomalous is non-anomalous; and
store the identifier corresponding to the communication for future determinations, wherein future communications involving the identifier and the at least one client are not determined to be anomalous.

13. The non-transitory computer-accessible storage medium of claim 1, wherein the program instructions are further executable to:
- block communications determined to be anomalous; or
- report communications determined to be anomalous.

14. The non-transitory computer-accessible storage medium of claim 1, wherein the first plurality of communications between the at least one client and the first one or more servers or the second plurality of communications between the at least one client and the second one or more server comprises one or more of:
- a request from an HTTP client to an HTTP server;
- a transaction to send or receive an email; or
- a message using an online chat or instant messaging service.

15. The non-transitory computer-accessible storage medium of claim 1, wherein said determining the plurality of identifiers and determining if the one or more communications are anomalous comprises:
- mapping the identifier to one or more other identifiers; and
- using the one or more other identifiers to determine if the one or more communications of the at least one client are anomalous.

16. The non-transitory computer-accessible storage medium of claim 1, wherein the at least a subset of the plurality of identifiers comprise one or more email addresses comprised in a body of an email.

17. The non-transitory computer-accessible storage medium of claim 16, wherein said determining if the one or more communications are anomalous comprises:
- determining that a first communication of the one or more communications specifies an email address of the one or more email addresses as a destination email address; and
- determining that the first communication is not anomalous based on determining that the first communication specifies the email address as a destination email address.

18. The non-transitory computer-accessible storage medium of claim 1, wherein the at least a subset of the plurality of identifiers comprise one or more URIs comprised in a body of a web page.

19. The non-transitory computer-accessible storage medium of claim 18, wherein the web page comprises a search results web page of a search engine, wherein the one or more URIs correspond to search results of an initial query provided to the search engine.

20. The non-transitory computer-accessible storage medium of claim 18, wherein said determining if the one or more communications are anomalous comprises:
- determining that a first communication of the one or more communications specifies a first URI of the one or more URIs as a destination URI; and
- determining that the first communication is not anomalous based on determining that the first communication specifies the first URI as the destination URI.

21. A method for detecting anomalous network application behavior, comprising:
- monitoring a first plurality of communications between at least one client and a first one or more servers, wherein the at least one client and the first one or more servers communicate using one or more application protocols, wherein said monitoring the first plurality of communications is performed without participating in the communication between the at least one client and the first one or more servers;
- determining a plurality of uniform resource identifiers (URIs) based on said monitoring, wherein at least a subset of the plurality of URIs are comprised in content of the first plurality of communications, wherein said determining is performed without participating in the communication between the at least one client and the one or more servers;
- monitoring a second plurality of communications between the at least one client and a second one or more servers, wherein the at least one client and the second one or more servers communicate using one or more application protocols, wherein said monitoring the second plurality of communications is performed without participating in the communication between the at least one client and the second one or more servers;
- for one or more communications of the second plurality of communications, determining if the one or more communications are anomalous based at least in part on the at least a subset of the determined plurality of URIs, wherein said determining is performed at the application-protocol level, wherein if the one or more communications do not correspond to the plurality of URIs, the one or more communications of the at least one client are determined to be anomalous, wherein said determining comprises:
- analyzing the second plurality of communications to determine non-anomalous network application behavior between the at least one client and the one or more servers using the at least a subset of the determined plurality of identifiers; and
- determining the anomalous network application behavior by eliminating the determined non-anomalous network application behavior from the second plurality of communications; and
- storing information regarding the determined anomalous network application behavior.

22. The method of claim 21, further comprising:
- flagging the one or more communications involving the at least one client for further analysis if they are determined to be anomalous; and
- performing one or more security actions based on said flagging.

23. A system for detecting anomalous network application behavior, comprising:
- a processor; and
- a memory medium coupled to the processor, comprising program instructions executable by the processor to:
- monitor network traffic between at least one client and one or more servers, wherein the at least one client and the one or more servers communicate using one or more application protocols, wherein said monitoring is performed without participating in the communication between the at least one client and the one or more servers, and wherein the network traffic comprises a first plurality of communications and a second plurality of communications;
- analyze the network traffic to determine anomalous network application behavior between the at least one client and the one or more servers, wherein said analyzing the network traffic to determine anomalous network application behavior comprises:
- determining a plurality of identifiers based on said monitoring, wherein at least a subset of the plurality of identifiers are comprised in content of the first plurality of communications, wherein said determining is performed without participating in the communication between the at least one client and the one or more servers, and wherein the plurality of identifiers comprise one or more of a contact, an IP address, a uniform resource identifier (URI), an extensible resource identifier (XRI), an email address, a service name, a device name, a telephone number, an SIP address, a domain name, an online screen name, an online handle, or a user name;

for one or more communications of the second plurality of communications, determining if the one or more communications are anomalous based at least in part on the at least a subset of the determined plurality of identifiers, wherein said determining is performed at the application-protocol level, wherein if the one or more communications do not correspond to one of the plurality of identifiers, the one or more communications of the at least one client are determined to be anomalous, wherein said determining comprises:

analyzing the second plurality of communications to determine non-anomalous network application behavior between the at least one client and the one or more servers using the at least a subset of the determined plurality of identifiers; and determining the anomalous network application behavior by eliminating the determined non-anomalous network application behavior from the second plurality of communications.

* * * * *